United States Patent [19]

Lindler

[11] Patent Number: 5,361,529

[45] Date of Patent: Nov. 8, 1994

[54] LINE GUIDE FOR FISHING ROD

[76] Inventor: James M. Lindler, 180 W. Highway 378, Lexington, S.C. 29072

[21] Appl. No.: 63,910

[22] Filed: May 18, 1993

[51] Int. Cl.5 .............................. A01K 87/04
[52] U.S. Cl. ................................................ 43/24
[58] Field of Search ........................................... 43/24

[56] References Cited

U.S. PATENT DOCUMENTS

| 2,619,714 | 12/1952 | Dornaus | 43/24 |
| 2,650,447 | 9/1953 | Johnson | 43/24 |
| 3,063,186 | 11/1962 | Ward, IV | 43/24 |
| 3,171,229 | 3/1965 | Shobert | 43/24 |
| 3,841,014 | 10/1974 | Thomas, Jr. et al. | 43/43.16 |
| 4,035,454 | 7/1977 | Klein | 43/24 |
| 4,702,031 | 10/1987 | Sousa | 43/24 |
| 5,090,150 | 2/1992 | Pirazzini | 43/24 |

FOREIGN PATENT DOCUMENTS 1132624 11/1968 United Kingdom ............ 43/24

Primary Examiner—P. Austin Bradley
Assistant Examiner—Chuck Y. Mah
Attorney, Agent, or Firm—Frederick K. Lacher

[57] ABSTRACT

A fishing rod has a plurality of spaced-apart line guides along the length of the rod. Each of the line guides includes a hoop member supported by a bracket. The bracket has a foot which is secured to the rod by means of a housing having a pocket member which receives the foot. The housing which may be molded is generally cylindrical and has an internal bore which may be tapered to receive the rod.

1 Claim, 3 Drawing Sheets

LINE GUIDE FOR FISHING ROD

This invention relates to line guides for fishing rods, and more specifically to a new line guide which is simpler and easier to produce while still delivering excellent performance.

Previously, a line guide was affixed to a fishing rod by aligning the foot of the line guide coaxially with the axis of the fishing rod and securing it thereto by winding a plurality of wraps of cord about the fishing rod. After a number of wraps had been made, the cord was secured in this position by a resin material or shellac or the like. While this method has been generally effective and is used by many rod manufacturers, improvements were desirable.

In accordance with one aspect of the invention, there is provided a line guide for a fishing rod which comprises a housing having a bore. The housing also has an outer surface and an inner surface which defines the bore extending there through. The diameter of the bore at the tip end of the housing is smaller than the diameter of the bore at the reel end of the housing.

In accordance with another aspect of the invention, a line guide for a fishing rod is provided in which the line guide has a housing and a pocket member. The pocket member is a part of the housing and receives a foot of a hoop member.

In accordance with another aspect of the invention, a fishing rod comprises a rod and a housing. The rod has a reel end and a tip end. The housing is fixedly mounted on the rod and has an outer surface and an inner surface which defines a bore extending through the housing. The rod is received within the bore. The housing also has a reel end and a tip end, a diameter of the bore at the tip end being smaller than the diameter of the bore at the reel end.

In accordance with another aspect of the invention, there is provided a method of affixing a line guide to a fishing rod with the fishing rod having a reel end and a tip end, the line guide having a housing, the housing having a reel end, a tip end and a bore through said housing wherein the method comprises the steps of:

(a) placing the tip end of the rod into the reel end of the housing;

(b) sliding the housing along the rod toward the reel end of the rod; and, (c) affixing the housing to the rod.

IN THE DRAWINGS

DETAILED DESCRIPTION OF THE PREFERRED EMBODIMENTS

Figure 1:
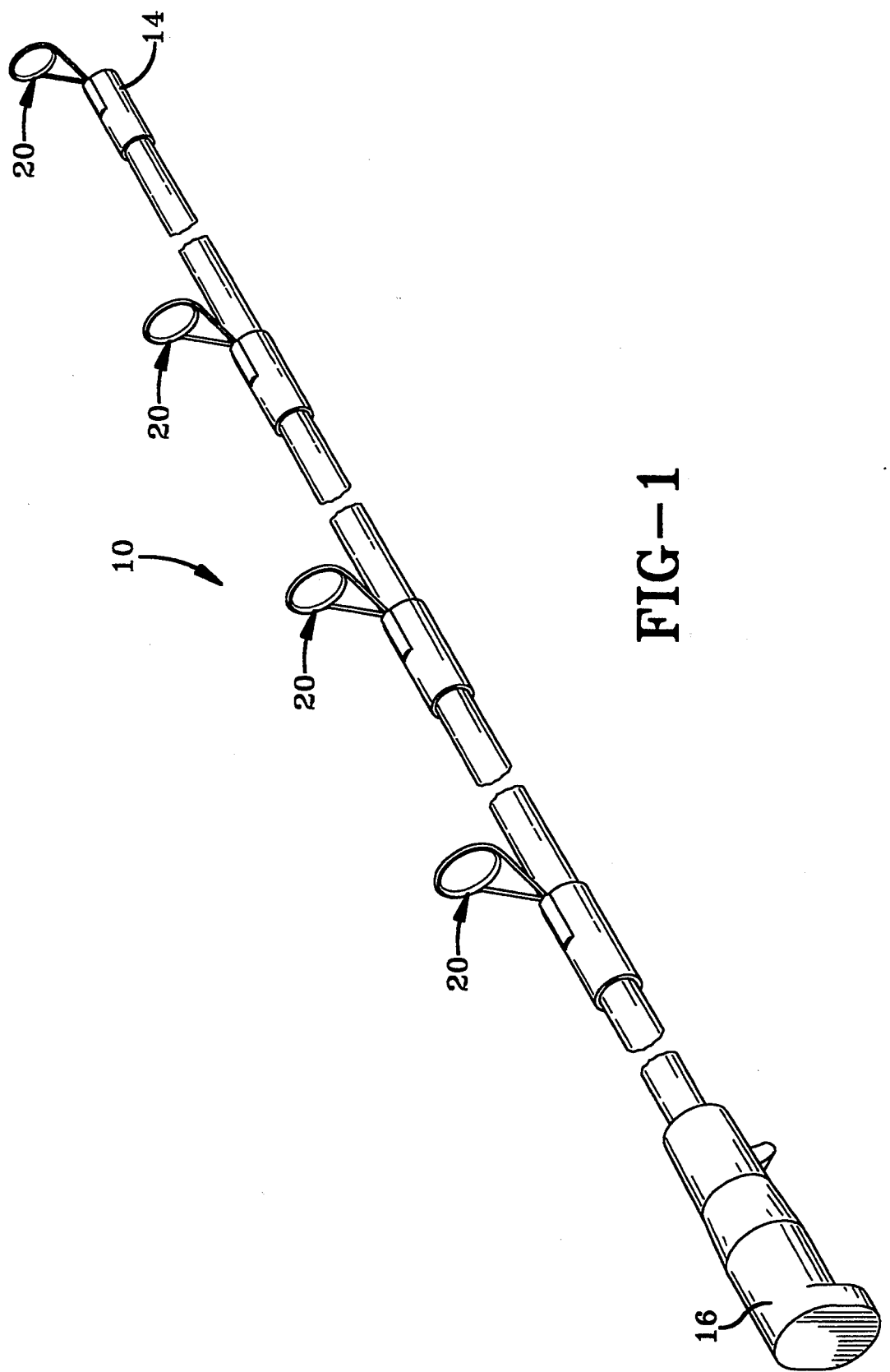
FIG. 1 is a perspective view of a fishing rod embodying the invention.

Referring to FIG. 1, a rod 10 is shown having a reel end 12 and a tip end 14. In the particular embodiment shown in FIG. 1, a handle 16 is mounted at the reel end 12 of the rod 10. As is typical in many fishing rods 10, the rod 10 is tapered, with the diameter of the rod decreasing from the reel end 12 to the tip end 14. This taper provides for flexibility and sensitivity at the tip end 14 in order to feel the actions of a fish at the end of a fishing line while providing strength and stability at the reel end 12. In the embodiment of rod 10 shown in FIG. 1, five line guides 20 are spaced along the length of the rod 10.

Figure 2:
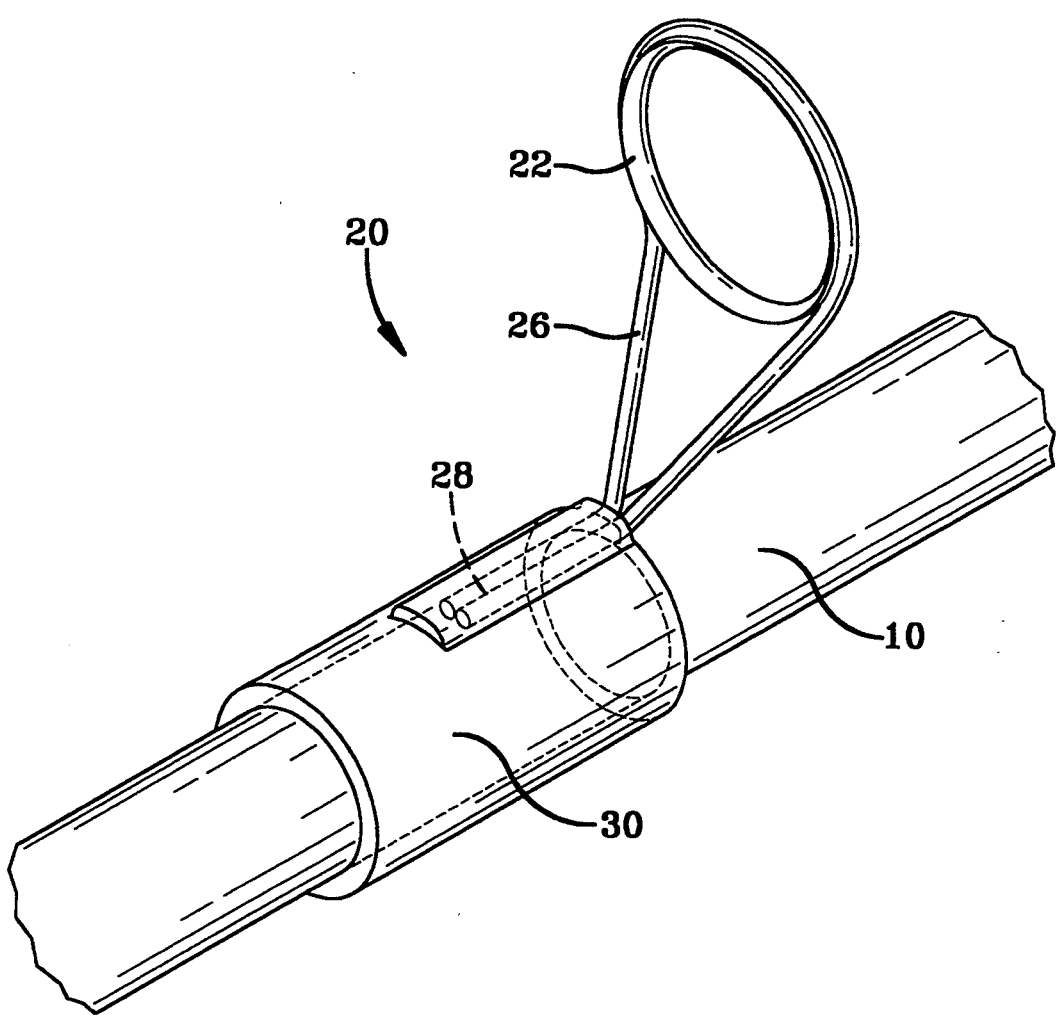
FIG. 2 is an enlarged view of a section of the fishing rod shown in FIG. 1 with a line guide embodying the invention.

With reference to FIG. 2, one representative line guide 20 is shown in an enlarged view. The line guide 20 includes a hoop member 22 through which the fishing line (not shown) is threaded. A bracket 26 encircles hoop member 22 and secures it to the rod 10 by means of foot 28. The bracket 26 and foot 28 are generally made of a metal stamping with an axial centerline of the foot 28 generally perpendicular to the plane containing the hoop member 22.

The foot 28 is secured to the rod 10 by slipping it under a housing 30. The housing 30 extends around the rod 10 and is in engagement with both the rod 10 and the foot 28. Preferably, the housing 30 is integral, having structural rigidity to support the line guide 20. This provides an attachment to the rod which is not possible with the wraps of cord discussed previously or other contemplated alternatives such as shrinking a plastic sleeve on the rod 10.

Figure 3A:
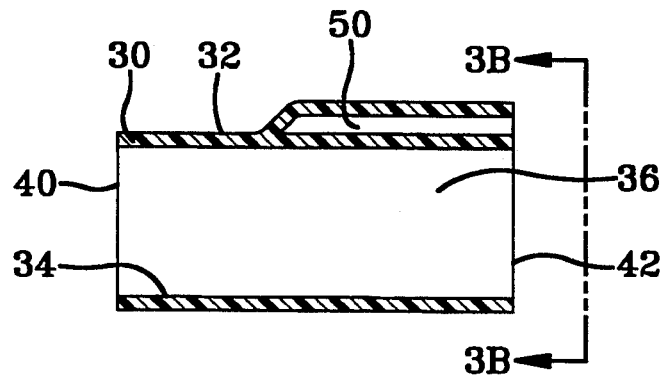
FIG. 3A is a side cross-sectional view of one embodiment of the invention taken along the line 3A—3A in FIG. 3B.

With reference to FIGS. 3A-5b, three embodiments of the housing 30 are shown. With reference to FIGS. 3A-3B, the housing 30 has an outer surface 32, and an inner surface 34 which defines a bore 36. The bore 36 receives the rod 10, as shown in FIG. 2. The housing 30 has a tip end 40 and a reel end 42. The preferred orientation of the housing 30 is shown in FIG. 1 and is described with the tip end 40 and reel end 42 as shown in FIG. 3A. However, this orientation can be reversed or can also be successfully employed with a housing 30 on either side of the hoop member 22. In some large rods 10, such as those used for salt water fishing, it is often necessary to support a hoop member 22 with brackets 26 on either side of the hoop member 22. In such case, a housing 30 and foot 28 would be positioned on either side of the hoop member 22.

Figure 3B:
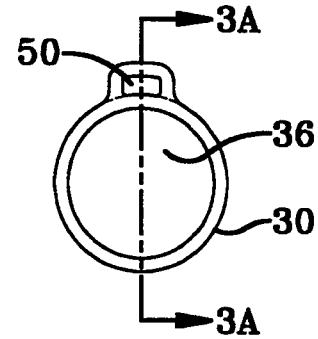
FIG. 3B is an end view of the embodiment of the invention shown in FIG. 3A taken along line 3B—3B.

With continuing reference to FIGS. 3A and 3B, a pocket member 50 is located in an inner surface 34 of the housing 30. The pocket member 50 has an open end 52 which receives the foot 28 of the bracket 26. The foot 28 is secured within the pocket member 50 by means of an adhesive (not shown). The preferred adhesive is an epoxy.

Figure 4A:
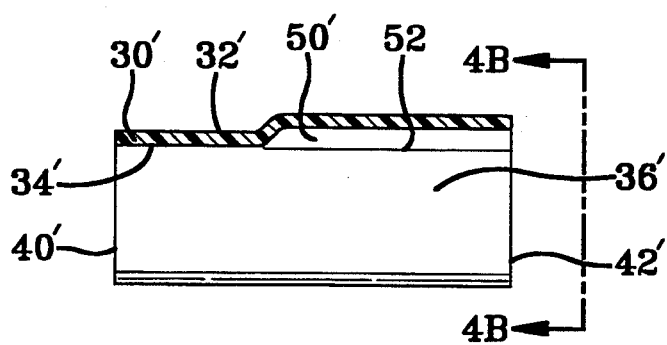
FIG. 4A is a side cross-sectional view of a second embodiment of the invention taken along the line 4A—4A in FIG. 4B.
Figure 4B:
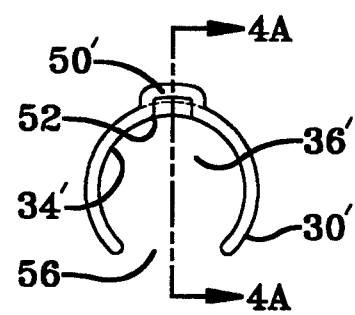
FIG. 4B is an end view of the embodiment of the invention shown in FIG. 4A taken along line 4B—4B.

With reference to FIGS. 4A and 4B, an alternate embodiment of the housing 30' is disclosed. In this embodiment, the housing 30' does not extend completely around the periphery of the rod 10. Instead, a gap 56 in the housing 30' is located on the opposite side of the pocket member 50'. The pocket member 50' may include a groove 52' in the inner surface 34' of the housing 30'. Possible advantages of this embodiment include material savings and ease in fitting the housing 30 over certain types of rods 10.

Figure 5A:
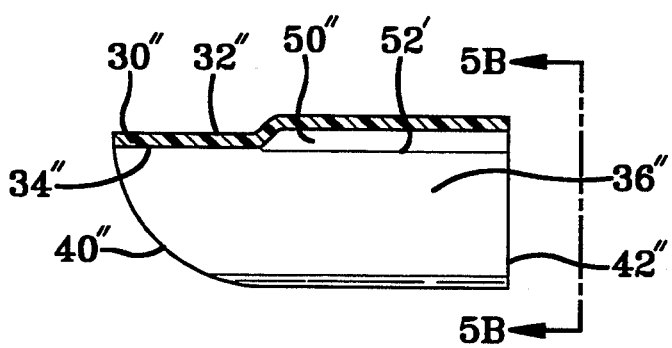
FIG. 5A is a side cross-sectional view of a third embodiment of the invention taken along the line 5A—5A in FIG. 5B.
Figure 5B:
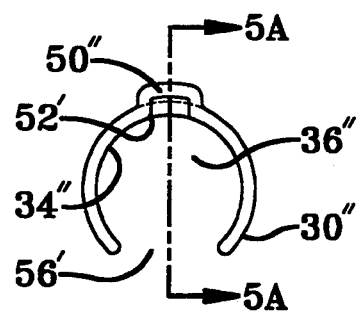
FIG. 5B is an end view of the embodiment of the invention shown in FIG. 5A taken along line 5B—5B.

With reference to FIGS. 5A and 5B, a third embodiment of the invention is disclosed. In this embodiment, the tip end 42" has been rounded and provided with a radius 58. This embodiment also features a gap 56' opposite the pocket member 50" and a groove 52' in the inner surface 34" of the housing 30".

The preferred material for the housing 30 is nylon or a family of thermoplastics that contain three monomeric building blocks, Acrylonitrile, Butadiene and Styrene, commonly known as ABS. While the housing 30 can be turned on a lathe, the preferred embodiment would be molded, such as by injection molding. The preferred material for the housing is ABS or "Cycolac" which is a trade name for ABS owned by Borg-Warner Corporation. This material may be adhered to fiberglass, a common material for fishing rods 10.

As in best seen in FIG. 1, the size of the line guides 22 generally decreases from the reel end 12 to the tip end 14 of the rod 10. The bore 36 of the housing 30, as well as other dimensions of the housing 30, also decrease from the reel end 12 to the tip end 14 of the rod 10. A typical example showing the decrease in size of the bore 36 of the housings 30 used at different points along the length of the rod is a rod 10 where the bore 36 is 0.220 inches near the reel end 12, 0.145 inches at a point near the middle of the rod and 0.100 inches at the tip end 14 of the rod.

A similar example showing how the depth of the pocket member 50 changes along the length of the rod 10 include an embodiment in which the depth of the pocket member 50 at one of the line guides 20 near the reel end 12 of the rod 10 was 0.580 inches, 0.555 inches near the middle of the rod 10 and 0.390 inches near the tip end 14 of the rod 10.

A method affixing a line guide 22 to a fishing rod 10 will now be disclosed. The line guide 22 to be mounted nearest the reel end 12 of the rod 10 is inserted over the tip end 14 of the rod 10, with the reel end 42 of the housing 30 being nearest the reel end 12 of the rod 10. The housing 30 is moved along the rod 10 until its bore 36 wedges against the tapered surface of the rod 10. In a preferred embodiment of the housing 30, the bore 36 is tapered so that the diameter of the bore 36 at the reel end 42 of the housing 30 is greater than the diameter of the bore 36 at the tip end 40. An adhesive (not shown) is placed on the rod 10 at the position the housing 30 will rest so that the housing 30 becomes fixedly adhered to the rod 10 at this position. The procedure is continued with other line guides 22 and housings 30 of different diameters of the bore 36. The foot 28 of each line guide 20 is inserted into the pocket members 50 of the housings 30 and secured therein by means of a suitable adhesive.

While a certain representative embodiment and details have been shown for the purposes of illustrating the invention, it will be apparent to those skilled in the art that various changes and modifications may be made therein without departing from the spirit or scope of the invention.

What is claimed is:

1. A method of affixing a line guide to a tapered fishing rod wherein said fishing rod has a reel end and a tip end, said line guide has a housing with a pocket, a reel end, a tip end and a bore there through comprising applying an adhesive to said rod and then positioning and housing on said rod by the steps of:
   (a) placing said tip end of said rod into said reel end of said housing;
   (b) sliding said housing along said rod toward said reel end of said rod until said bore of said housing wedges against an outer surface of said rod;
   (c) affixing said housing to said rod; and,
   (d) securing a hoop member in said pocket.

* * * * *